US012800004B2

(12) United States Patent
Lee et al.

(10) Patent No.: US 12,800,004 B2
(45) Date of Patent: Nov. 17, 2026

(54) SOLENOID VALVE

(71) Applicant: HL MANDO CORPORATION, Gyeonggi-do (KR)

(72) Inventors: Jongsun Lee, Gyeonggi-do (KR); Wonbeen Im, Seoul (KR); Namho Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 244 days.

(21) Appl. No.: 18/515,285

(22) Filed: Nov. 21, 2023

(65) Prior Publication Data

US 2024/0240687 A1 Jul. 18, 2024

(30) Foreign Application Priority Data

Jan. 18, 2023 (KR) ........................ 10-2023-0007462

(51) Int. Cl.

*F16F 9/46* (2006.01)
*F16K 15/18* (2006.01)
*F16K 31/06* (2006.01)

(52) U.S. Cl.

CPC ............ *F16F 9/461* (2013.01); *F16K 15/184* (2021.08); *F16K 31/0644* (2013.01)

(58) Field of Classification Search

CPC .. F16F 9/461; F16F 9/34; F16F 9/3207; F16F 2222/06; F16F 9/464; F16F 9/465; F16K 15/184; F16K 31/0644; F16K 15/1823; F16K 31/0655; F16K 27/029; F16K 15/18; F16K 27/0209; F16K 31/0662; B60G 13/06

See application file for complete search history.

(56) References Cited

U.S. PATENT DOCUMENTS 5,409,088 A * 4/1995 Sonsterod ............. F16F 9/3214 188/282.3
5,501,307 A * 3/1996 Lars ........................ F16F 9/465 188/266.8

(Continued)

FOREIGN PATENT DOCUMENTS

JP 2001146937 A * 5/2001
JP 2002-168281 6/2002

(Continued)

OTHER PUBLICATIONS

JP 2001146937 English Translation (Year: 2001).*

(Continued)

*Primary Examiner* — Marina A Tietjen
(74) *Attorney, Agent, or Firm* — WOMBLE BOND DICKINSON (US) LLP

(57) ABSTRACT

A solenoid valve includes a valve case formed with an opening through which a fluid can flow and having an inner space formed therein, a valve body positioned at an upper side of the valve case, a driver configured to generate a magnetic field toward an inner side of the valve body, a rod configured to be vertically movable by the driver, a seat installed on a lower end of the rod to move according to movement of the rod, a core in contact with the seat to move according to movement of the seat, and a check valve surrounding a periphery of the core and disposed at a lower side of the valve body.

13 Claims, 26 Drawing Sheets

(56) References Cited

U.S. PATENT DOCUMENTS

| | | | | | |
|---|---|---|---|---|---|
| 5,850,896 | A * | 12/1998 | Tanaka | F16F 9/465 188/266.2 |
| 6,003,644 | A * | 12/1999 | Tanaka | F16F 9/465 188/266.5 |
| 8,485,224 | B2 * | 7/2013 | Forster | F16F 9/464 188/266.5 |
| 2009/0020382 | A1 * | 1/2009 | Van Weelden | F16F 9/465 188/282.3 |
| 2012/0205567 | A1 * | 8/2012 | Forster | F16K 31/0686 251/129.15 |
| 2013/0341142 | A1 * | 12/2013 | Forster | F16F 9/464 188/322.15 |
| 2016/0069471 | A1 * | 3/2016 | Ewers | F16F 9/46 137/489 |
| 2016/0076616 | A1 * | 3/2016 | Ewers | F16F 9/464 188/322.13 |
| 2016/0236533 | A1 * | 8/2016 | Inagaki | F16F 9/46 |
| 2017/0219042 | A1 * | 8/2017 | Callies | F16F 9/34 |
| 2017/0234395 | A1 * | 8/2017 | Ewers | F16F 9/34 137/487.5 |
| 2017/0241503 | A1 * | 8/2017 | Ewers | F16F 9/466 |
| 2017/0284496 | A1 | 10/2017 | Miwa et al. | |
| 2022/0412429 | A1 * | 12/2022 | Kim | F16F 9/19 |

FOREIGN PATENT DOCUMENTS

| | | |
|---|---|---|
| JP | 2002-295698 | 10/2002 |
| JP | 2014-156886 | 8/2014 |
| JP | 2020-98013 | 6/2020 |
| JP | 2021-44319 | 3/2021 |
| KR | 10-1998-0002962 | 3/1998 |
| KR | 2002-0032107 | 5/2002 |
| KR | 10-0726555 | 6/2007 |
| KR | 10-1515234 | 4/2015 |
| KR | 10-2016-0022963 | 3/2016 |
| KR | 10-2023-0000312 | 1/2023 |

OTHER PUBLICATIONS

Third Party Objection dated Feb. 27, 2025 for German Patent Application No. 10 2023 133 103.5 and its English translation provided by Applicant's foreign counsel.

Office Action (1st) dated Jul. 29, 2026 for Chinese Patent Application No. 202311762698.6 and its English translation provided by Applicant's foreign counsel/Google translate.

Notice of Allowance dated Jul. 10, 2026 for Korean Patent Application No. 10-2025-0043713 and its English translation provided by Applicant's foreign counsel.

* cited by examiner

SOLENOID VALVE

CROSS-REFERENCE TO RELATED APPLICATION

This application claims the benefit of Korean Patent Application No. 10-2023-0007462, filed on Jan. 18, 2023 in the Korean Intellectual Property Office, the disclosure of which is incorporated herein by reference in its entirety.

BACKGROUND

1. Technical Field

Some embodiments of the present disclosure generally relate to a solenoid valve, and more specifically, to a solenoid valve included in a shock absorber configured to provide a variable damping force and provided in a vehicle in order to damp a shock transmitted to the vehicle.

2. Description of the Related Art

In general, shock absorbers are installed in vehicles such as an automobile to absorb and buffer vibrations or shocks received from a road surface during traveling, thereby improving riding comfort. The shock absorber usually includes a cylinder and a piston rod installed to reciprocally move within the cylinder and compress and stretch the shock absorber in the cylinder. Each of the cylinder and the piston rod is coupled to a body, wheels, or axles.

When a damping force is set low, the shock absorber can improve riding comfort by absorbing vibrations caused by an unevenness on the road surface during traveling, while when the damping force is set high, a change in body attitude is suppressed and steering stability is improved.

As described above, although the shock absorber capable of adjusting the damping force characteristics according to the road surface and traveling conditions has been developed, there is a problem in that such a conventional shock absorber may have a complicated device structure, thereby causing a large dispersion of a damping force during mass production and in particular, increasing the damping force due to an unintended flow path resistance in a high-speed region.

Therefore, the shock absorber for providing variable damping force, which is equipped with a damping force variable valve capable of appropriately adjusting the damping force characteristics at one side of the shock absorber to appropriately adjust the damping characteristics in order to improve riding comfort or steering stability according to a road surface, a traveling condition, etc., has been developed.

The shock absorber for providing variable damping force may include a valve assembly for variably adjusting a damping force, and the valve assembly for variably adjusting the damping force may change the damping force between a hard mode in which a spool of a solenoid valve closes an auxiliary flow path to generate a high damping force and a soft mode in which the spool opens the auxiliary flow path to generate a low damping force.

SUMMARY

Therefore, it is an aspect of the present disclosure to provide a solenoid valve capable of preventing a phenomenon in which a pressure of a retreat pilot chamber is changed during a compression stroke to make a damping force curve unstable.

It is another aspect of the present disclosure to provide a solenoid valve capable of preventing a phenomenon in which a hydraulic pressure is introduced into a retreat pilot chamber and thus a compression stroke is locked.

Additional aspects of the disclosure will be set forth in part in the description which follows and, in part, will be obvious from the description, or may be learned by practice of the disclosure.

In accordance with one aspect of the present disclosure, a solenoid valve includes a valve case formed with an opening through which a fluid flows and having a space formed therein, a valve body positioned at an upper side of the valve case, a driver configured to generate a magnetic field to an inner side of the valve body, a rod configured to vertically move by the driver, a seat installed on a lower end of the rod to move according to movement of the rod, a core in contact with the seat to move according to movement of the seat, and a check valve configured to surround a periphery of the core and disposed at a lower side of the valve body.

The check valve may include a housing formed with other openings configured to communicate with the opening of the valve case, and an opening and closing module installed an upper side of the housing.

The opening and closing module may include a plug accommodated at the upper side of the housing, a ball configured to vertically move within the plug, and a disk disposed at a lower side of the ball and formed with a plurality of openings.

A first channel having a smaller diameter than the ball may be formed on an upper portion of the plug, and a second channel having a smaller diameter than the ball may be formed on a lower portion of the plug.

When the ball moves up to close a lower end of the first channel, an inflow of the fluid flowing from an outside to an inside of the housing may be blocked, and when the ball moves down and is in contact with the disk, a flow of the fluid flowing from the inside to the outside of the housing may be allowed.

The opening and closing module may include a sub-seat formed with a plurality of openings, and a valve ring disposed at a lower side of the sub-seat.

A channel groove for forming a flow path of the fluid may be formed in the sub-seat.

When the valve ring moves up to close a lower end of the opening, an inflow of the fluid flowing from an outside to an inside of the housing may be blocked, and when the valve ring moves down and is spaced apart from the lower end of the opening, a flow of the fluid flowing from the inside to the outside of the housing may be allowed.

The solenoid valve may further include a guide disposed on the valve body to guide the movement of the rod.

A reservoir for storing the fluid may be formed at a lower side of the core.

In accordance with another aspect of the present disclosure, a solenoid valve includes a valve case formed with an opening through which a fluid flows and having a space formed therein, a valve body positioned at an upper side of the valve case, a driver disposed between the valve case and the valve body, a rod configured to vertically move by the driver, a seat installed on a lower end of the rod to move according to movement of the rod, a core in contact with the seat to move according to movement of the seat, a housing disposed between the valve body and the core and formed with an opening, a sub-seat disposed at a upper side of the housing, and a valve ring configured to vertically move at a lower side of the sub-seat.

The solenoid valve may further include a spring disposed at a lower side of the valve ring.

The spring may include a first ring, a second ring having a larger diameter than the first ring, and a seam part connecting the first ring and the second ring and having a predetermined pattern.

A hole vertically passing through the sub-seat may be formed in the sub-seat, and a groove recessed to a predetermined depth may be formed in the sub-seat at a position at which the hole is formed.

The spring may have a strip shape and have a vertically curved wave shape.

A channel groove for forming a flow path of the fluid passing through the opening may be formed in the sub-seat.

In accordance with still another aspect of the present disclosure, a solenoid valve includes a valve case formed with an opening through which a fluid flows and having a space formed therein, a valve body positioned at an upper side of the valve case, a driver configured to receive power to generate a magnetic field, a rod configured to vertically move by the driver, a seat installed on a lower end of the rod to move according to movement of the rod, a core in contact with the seat to move according to movement of the seat, a housing formed with other openings configured to communicate with the opening of the valve case, a plug disposed at an upper side of the housing, a disk disposed at a lower side of the plug, and a spring configured to provide a restoring force to the disk.

The plug may have a cylindrical shape with a channel formed therein, and an accommodation part having a size corresponding to the plug to accommodate the plug may be formed in the housing.

The disk may have a leg extending outward from an edge thereof.

When the disk moves up to close the channel of the plug, an inflow of the fluid flowing from an outside to an inside of the housing may be blocked, and when the disk moves down to open the channel of the plug, a flow of the fluid flowing from the inside to the outside of the housing may be allowed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
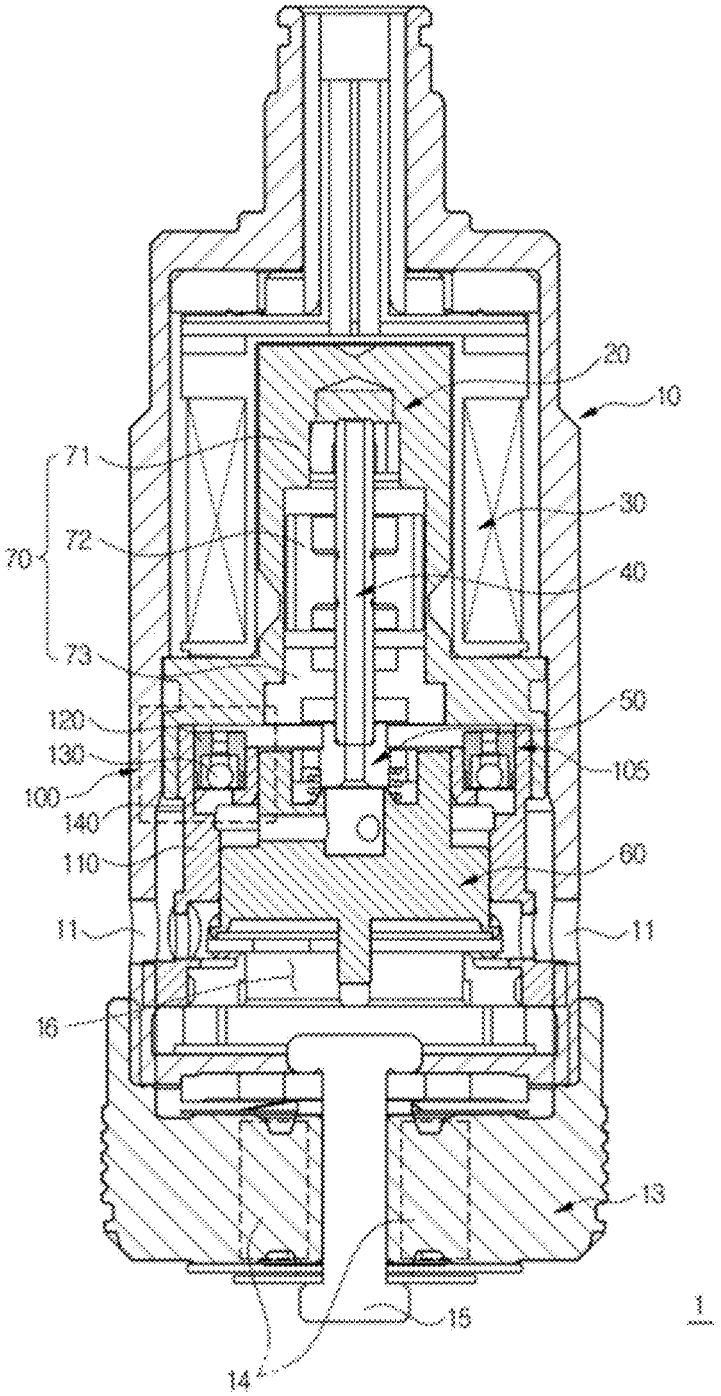
FIG. 1 is a cross-sectional view for illustrating a solenoid valve according to a first embodiment of the present disclosure.

Hereinafter, embodiments of the present disclosure will be described in detail with reference to the accompanying drawings. The following embodiments are presented to sufficiently convey the spirit of the present disclosure to those skilled in the art to which the present disclosure pertains. The present disclosure may also be specified in other forms without being limited to only the embodiments presented herein. In the drawings, in order to clarify the present disclosure, illustration of parts irrelevant to the description may be omitted, and the sizes of components may be slightly exaggerated to help understanding.

Figure 2:
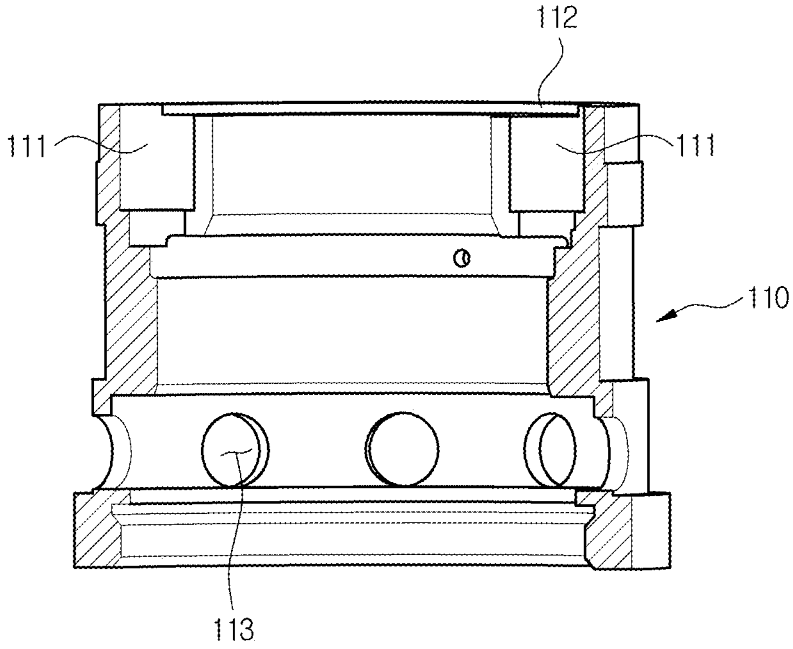
FIG. 2 is a cross-sectional view for illustrating a housing included in a solenoid valve according to a first embodiment of the present disclosure.
Figure 3:
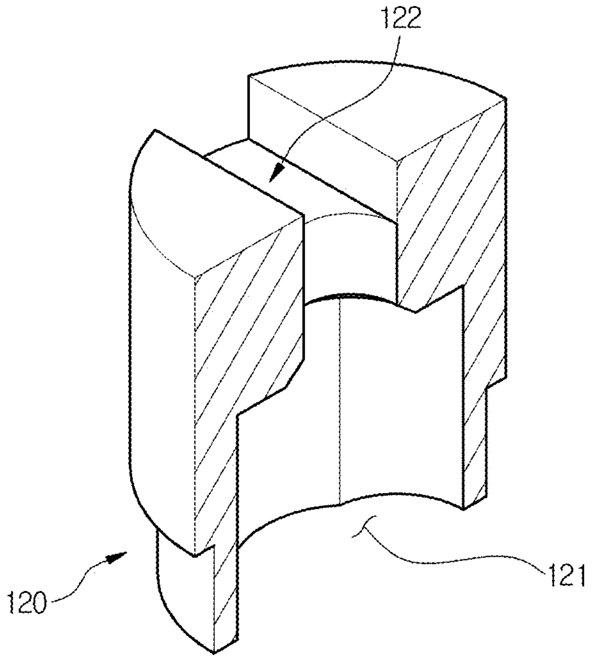
FIG. 3 is a cross-sectional view for illustrating a plug included in a solenoid valve according to a first embodiment of the present disclosure.
Figure 4:
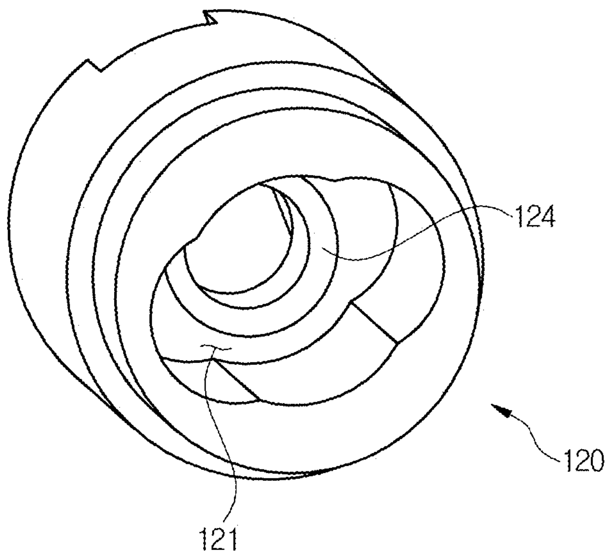
FIG. 4 is a perspective view illustrating a plug included in a solenoid valve according to a first embodiment of the present disclosure.
Figure 5:
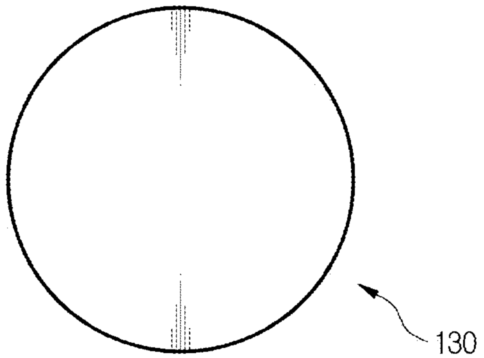
FIG. 5 is a perspective view for illustrating a ball included in a solenoid valve according to a first embodiment of the present disclosure.
Figure 6:
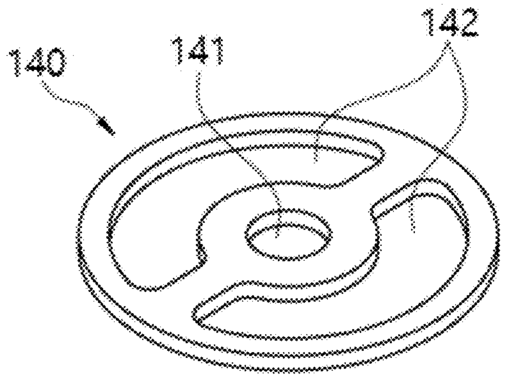
FIG. 6 is a perspective view for illustrating a disk included in a solenoid valve according to a first embodiment of the present disclosure.

FIG. 1 is a cross-sectional view for illustrating a solenoid valve according to a first embodiment of the present disclosure. FIG. 2 is a cross-sectional view for illustrating a housing included in a solenoid valve according to a first embodiment of the present disclosure. FIG. 3 is a cross-sectional view for illustrating a plug included in a solenoid valve according to a first embodiment of the present disclosure. FIG. 4 is a perspective view for illustrating a plug included in a solenoid valve according to a first embodiment of the present disclosure. FIG. 5 is a perspective view for illustrating a ball included in a solenoid valve according to a first embodiment of the present disclosure. FIG. 6 is a perspective view for illustrating a disk included in a solenoid valve according to a first embodiment of the present disclosure.

A solenoid valve 1 according to a first embodiment of the present disclosure may be used to adjust a hydraulic pressure in a shock absorber for providing a variable damping force. The solenoid valve 1 may include a valve case 10 having an opening 11 through which a fluid flows and having a space formed therein, a valve body 20 positioned at an upper side or portion of the valve case 10, a driver 30 configured to generate a magnetic field toward an inner side of the valve body 20, a rod 40 configured to be vertically movable by the driver 30, a seat 50 formed or installed on a lower end of the rod 40 to move according to the movement of the rod 40, a core 60 in contact with the seat 50 to move according to the movement of the seat 50, and check valves 100 surrounding a part of a periphery of the core 60 and disposed at a lower side or portion of the valve body 20.

A lower case 13 maybe coupled to a lower side or a lower end of the valve case 10. A cap 15 maybe fitted into the lower case 13. In addition, a reservoir 16 for storing a fluid may be formed in a lower space of the core 60. In addition, flow path spaces 14 for the fluid to pass therethrough may be formed in the lower case 13. Therefore, the fluid may pass through the flow path spaces 14, the reservoir 16, and the openings 11 in a sequential or reverse order.

The check valves 100 may be used to restrict a flow direction of the fluid. The check valve 100 may include a housing 110 having openings 113 that are capable of fluidly communicating with the opening 11 of the valve case 10, and an opening and closing module 105 installed at an upper side or portion of the housing 110. An accommodation part 111 configured to accommodate a plug 120, and a seating portion 112 may be formed at the upper side or portion of the housing 110. The opening and closing module 105 may have any structure capable of selectively restricting the flow of the fluid.

The opening and closing module 105 may include the plug 120 accommodated at the upper side or portion of the housing 110, a ball 130 configured to be vertically movable within the plug 120, and a disk 140 disposed at a lower side of the ball 130 and having a plurality of openings 141 and 142. A first channel 122 having a smaller diameter than the ball 130 may be formed on an upper portion of the plug 120, and a second channel 121 having a smaller diameter than the ball 130 may be formed on a lower portion of the plug 120.

The first channel 122 may have an asymmetrical shape with a horizontal width greater than a vertical width in order to facilitate the flow of the fluid. An inclined portion 124 for increasing a contact area with the ball 130 may be formed on a lower end of the first channel 122.

A central opening 141, on which the ball 130 can be seated, and side openings 142, through which the fluid passes, may be formed in the disk 140. A diameter of the central opening 141 of the disk 140 may be smaller than the diameter of the ball 130. Therefore, the disk 140 can support the ball 130 not to further move down while allowing the fluid to pass through the disk 140.

When the ball 130 moves up to close the lower end of the first channel 122, the inflow of the fluid flowing from an outside of the housing 110 to an inside of the housing 110 can be blocked. However, when the ball 130 moves down and is in contact with the disk 140, the flow of the fluid from the inside of the housing 110 to the outside of the housing 110 may be allowed.

A guide 70 maybe configured to guide the movement of the rod 40 so that the rod 40 can smoothly move vertically. The guide 70 may include a first guide 71 disposed at the upper side or portion of the valve body 20, a second guide 72 disposed at a middle portion of the valve body 20, and a third guide 73 disposed at the lower side or portion of the valve body 20.

Figure 7:
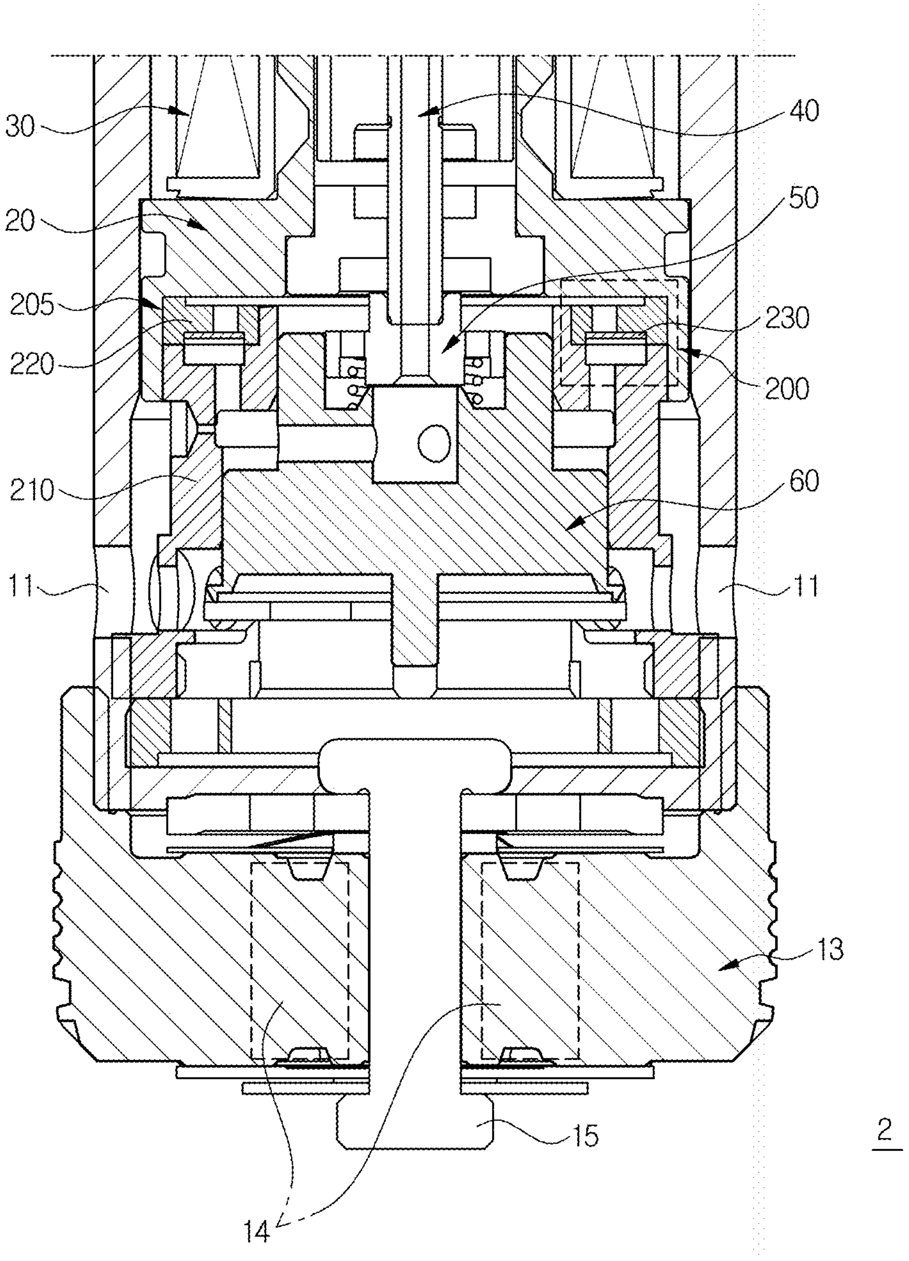
FIG. 7 is a cross-sectional view for illustrating a solenoid valve according to a second embodiment of the present disclosure.
Figure 8:
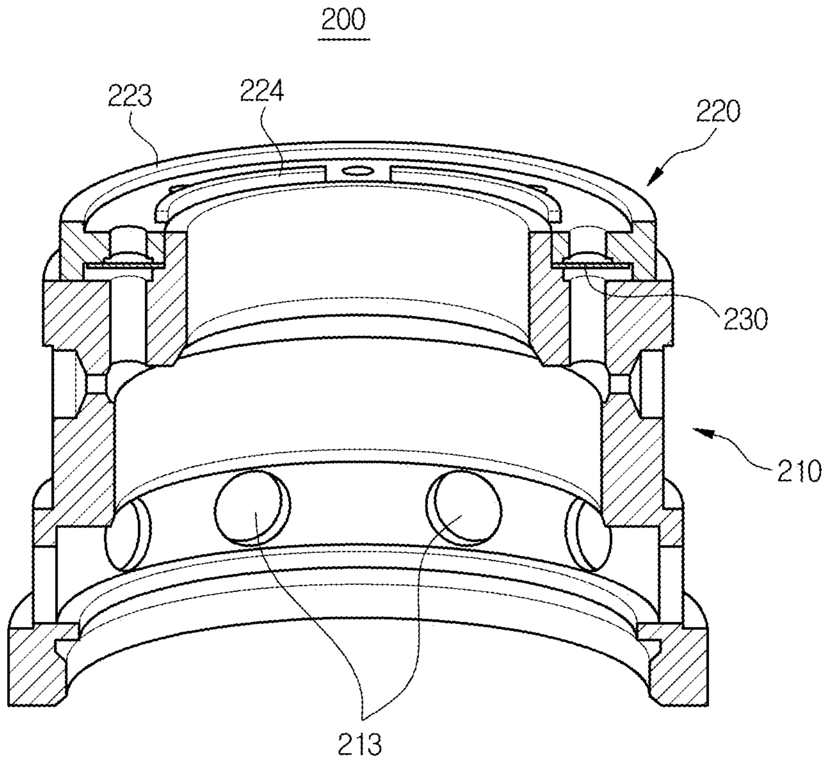
FIG. 8 is a cross-sectional view for illustrating a check valve included in a solenoid valve according to a second embodiment of the present disclosure.
Figure 9:
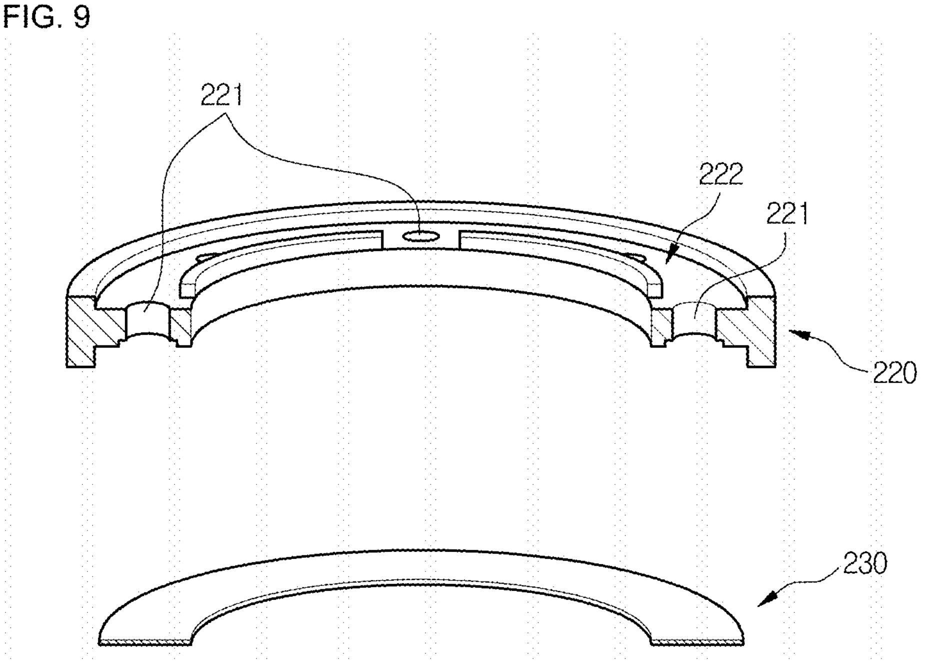
FIG. 9 is an exploded cross-sectional view for illustrating a sub-seat and a valve ring included in a solenoid valve according to a second embodiment of the present disclosure.

FIG. 7 is a cross-sectional view for illustrating a solenoid valve according to a second embodiment of the present disclosure. FIG. 8 is a cross-sectional view illustrating a check valve included in a solenoid valve according to a second embodiment of the present disclosure. FIG. 9 is an exploded cross-sectional view illustrating a sub-seat and a valve ring included in a solenoid valve according to a second embodiment of the present disclosure. An overlapping description of the configuration described above in the embodiment will be omitted.

A solenoid valve 2 according to a second embodiment of the present disclosure may include a valve case 10, a valve body 20, a driver 30, a rod 40, a seat 50, a core 60, and a check valve 200 surrounding a part of a periphery of the core 60 and disposed at a lower side or portion of the valve body 20.

The check valve 200 may include a housing 210 having openings 213 configured to fluidly communicate with an opening 11 of the valve case 10, and an opening and closing module 205 installed above the housing 210. The opening and closing module 205 may include a sub-seat 220 having a plurality of openings 221 and a valve ring 230 disposed under the sub-seat 220. The valve ring 230 may have, for example, but not limited to, a thin plate-like sheet shape.

A channel groove 222 for forming a flow path of a fluid may be formed on or in the sub-seat 220. A first channel wall 223 and a second channel wall 224 for forming the channel groove 222 may be formed at an upper side or portion of the sub-seat 220.

When the valve ring 230 moves up to close lower ends of the openings 221, the inflow of the fluid flowing from an outside of the housing 210 to an inside of the housing 210 can be blocked. However, when the valve ring 230 moves down and is disposed to be spaced apart from the lower end of the openings 221, the flow of the fluid from the inside of the housing 210 to the outside of the housing 210 may be allowed.

Figure 10:
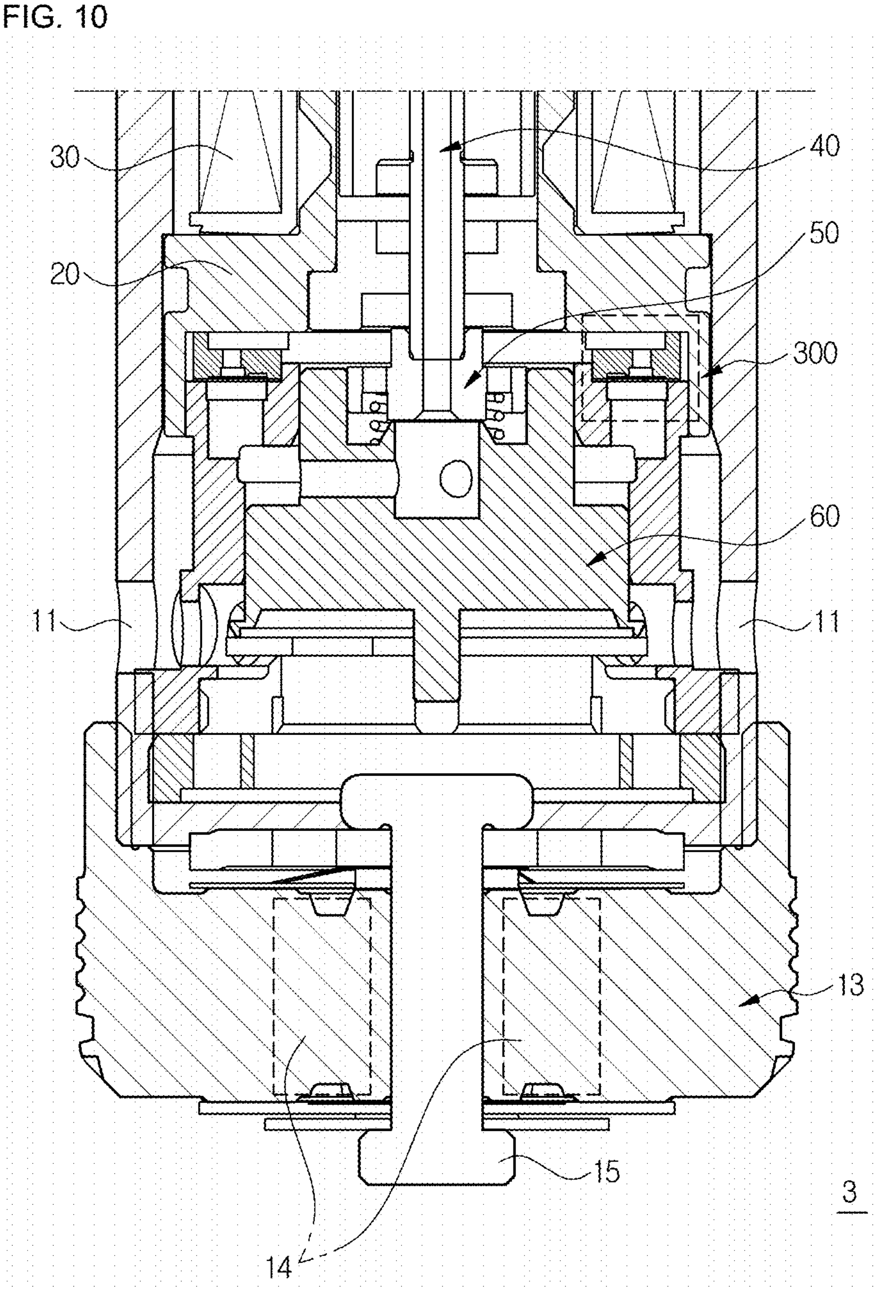
FIG. 10 is a cross-sectional view for illustrating a solenoid valve according to a third embodiment of the present disclosure.
Figure 11:
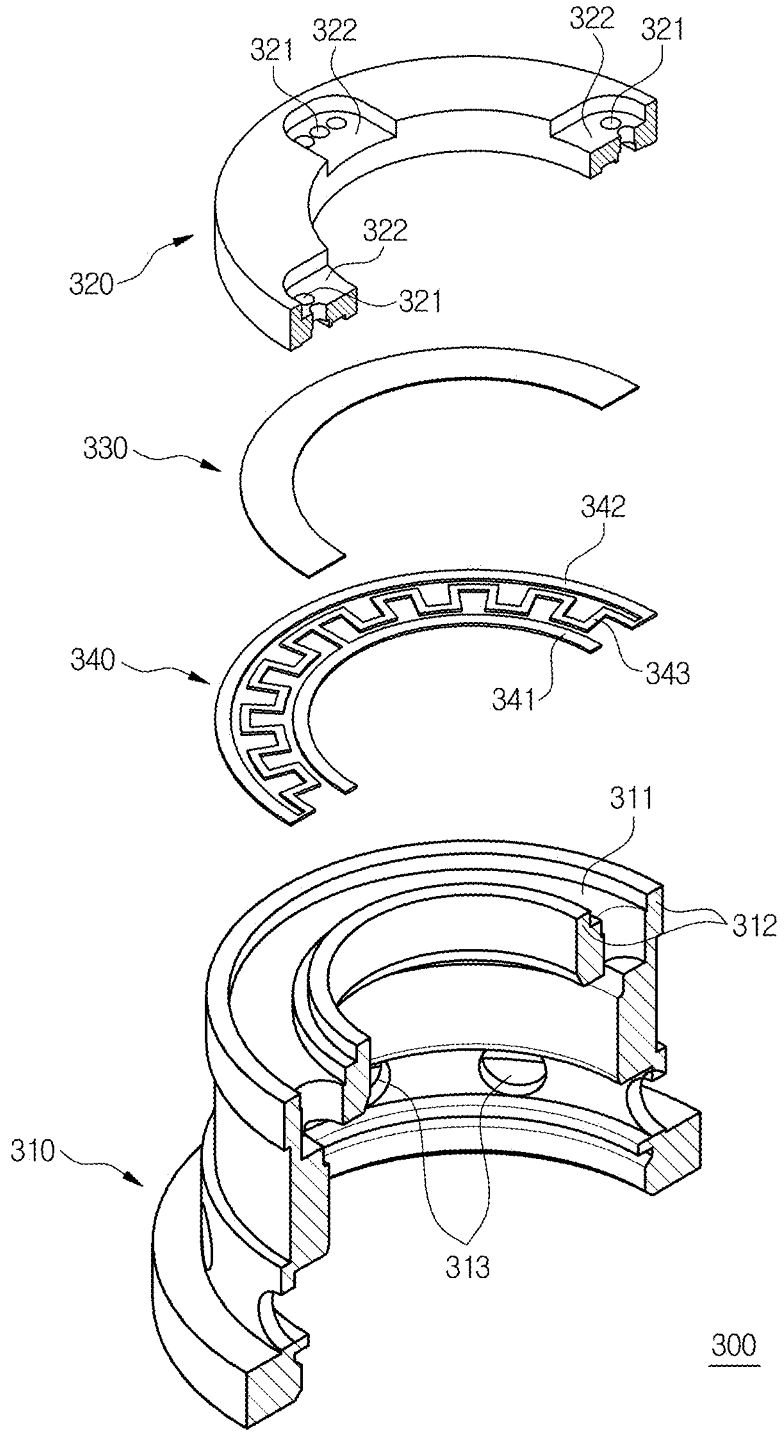
FIG. 11 is an exploded cross-sectional view for illustrating a check valve included in a solenoid valve according to a third embodiment of the present disclosure.

FIG. 10 is a cross-sectional view illustrating a solenoid valve according to a third embodiment of the present disclosure. FIG. 11 is an exploded cross-sectional view illustrating a check valve included in a solenoid valve according to a third embodiment of the present disclosure. An overlapping description of the configuration described above in the embodiment will be omitted.

A solenoid valve 3 according to a third embodiment of the present disclosure may include a valve case 10, a valve body 20, a driver 30, a rod 40, a seat 50, a core 60, and a check valve 300. The check valve 300 may include a housing 310 disposed between the valve body 20 and the core 60 and having an opening 313, a sub-seat 320 disposed above the housing 310, a valve ring 330 configured to be vertically movable under the sub-seat 320, and a spring 340 disposed under the valve ring 330. A ring groove 311 formed between ring walls 312 may be formed on or in an upper portion of the housing 310.

The spring 340 may include a first ring 341, a second ring 342 having a greater diameter than the first ring 341, and a seam part 343 connecting the first ring 341 and the second ring 342 and having a pattern. The seam part 343 of the spring 340 may have, for example, but not limited to, a shape in which generally "U"-shaped patterns bent at a right angle are repeated.

Holes 321 vertically passing through the sub-seat 320 may be formed in the sub-seat 320. The plurality of holes 321 may be formed at positions adjacent to each other. Grooves 322 recessed to a certain depth may be formed at positions at which the holes 321 are formed in the sub-seat 320. Therefore, a fluid may pass through the holes 321 and move along the grooves 322.

Figure 12:
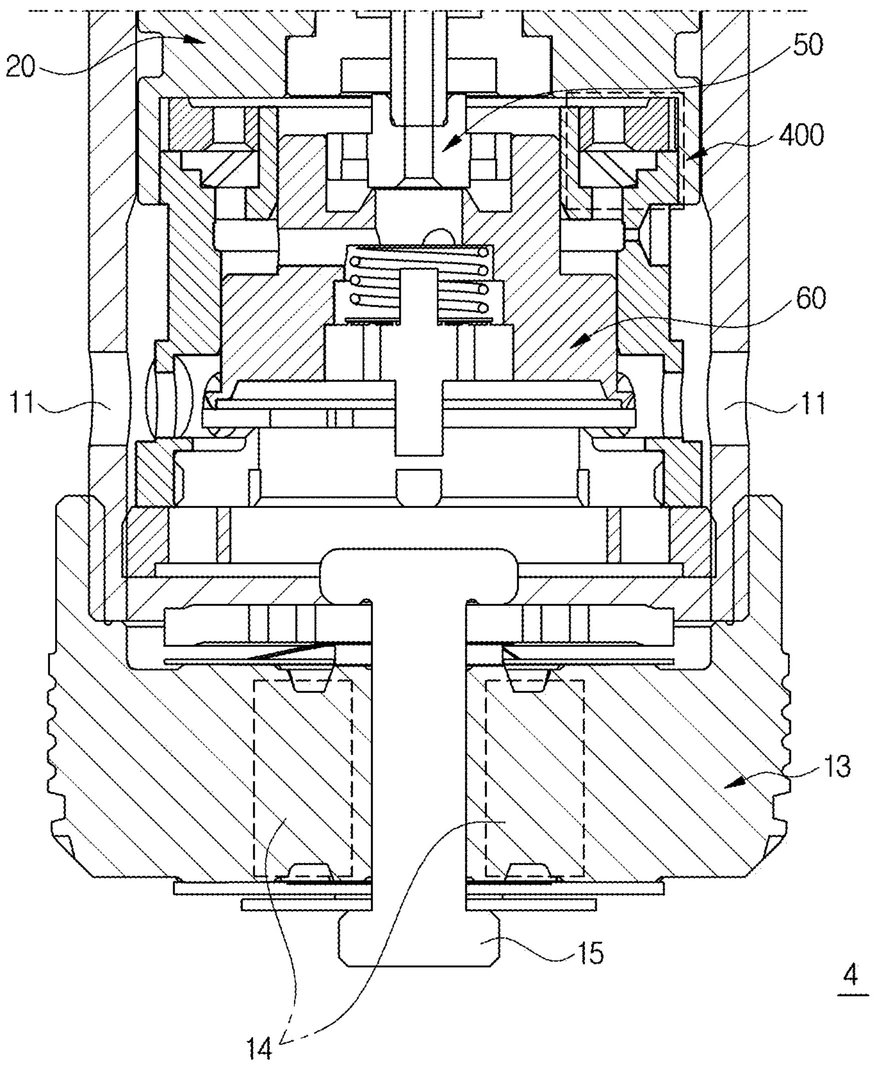
FIG. 12 is a cross-sectional view for illustrating a solenoid valve according to a fourth embodiment of the present disclosure.
Figure 13:
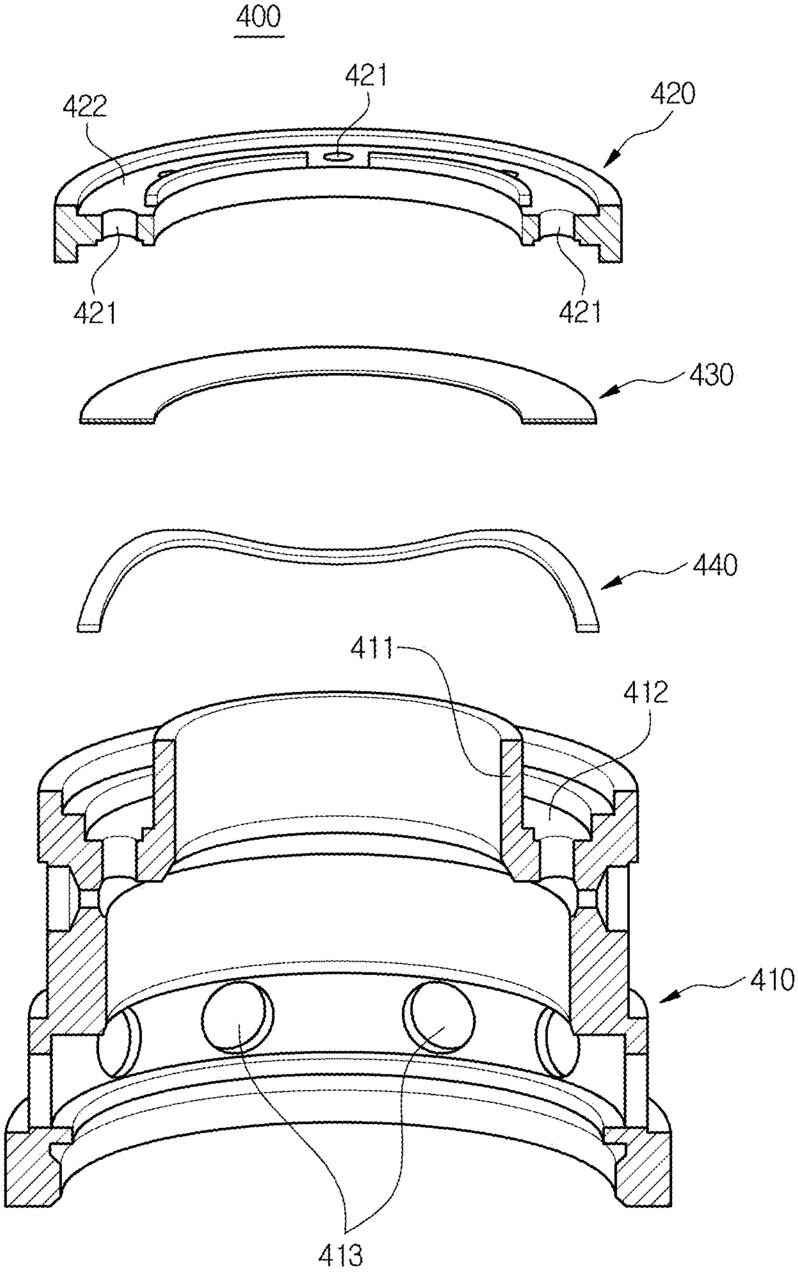
FIG. 13 is an exploded cross-sectional view for illustrating a check valve included in a solenoid valve according to a fourth embodiment of the present disclosure.

FIG. 12 is a cross-sectional view for illustrating a solenoid valve according to a fourth embodiment of the present disclosure. FIG. 13 is an exploded cross-sectional view for illustrating a check valve included in a solenoid valve according to a fourth embodiment of the present disclosure. An overlapping description of the configuration described above in the embodiment will be omitted.

A solenoid valve 4 according to a fourth embodiment of the present disclosure may include a valve case 10, a valve body 20, a driver 30, a rod 40, a seat 50, a core 60, and a check valve 400. The check valve 400 may include a housing 410 disposed between the valve body 20 and the core 60 and having an opening 413, a sub-seat 420 disposed above the housing 410, a valve ring 430 configured to be vertically movable under the sub-seat 420, and a spring 440 disposed under the valve ring 430. A circumferential wall 411 may be formed to protrude upward from an inner side of the housing 410.

The spring 440 may have, for instance, but not limited to, a strip shape and a vertically curved wave shape. That is, the spring 440 may provide a restoring force to the valve ring 430 to assist the valve ring 430 to stably open and close openings 421.

A channel groove 422 for forming a flow path of a fluid passing through the openings 421 may be formed on or in the sub-seat 420. Therefore, the fluid may pass through the openings 421 of the sub-seat 420 and flow along the channel groove 422.

Figure 14:
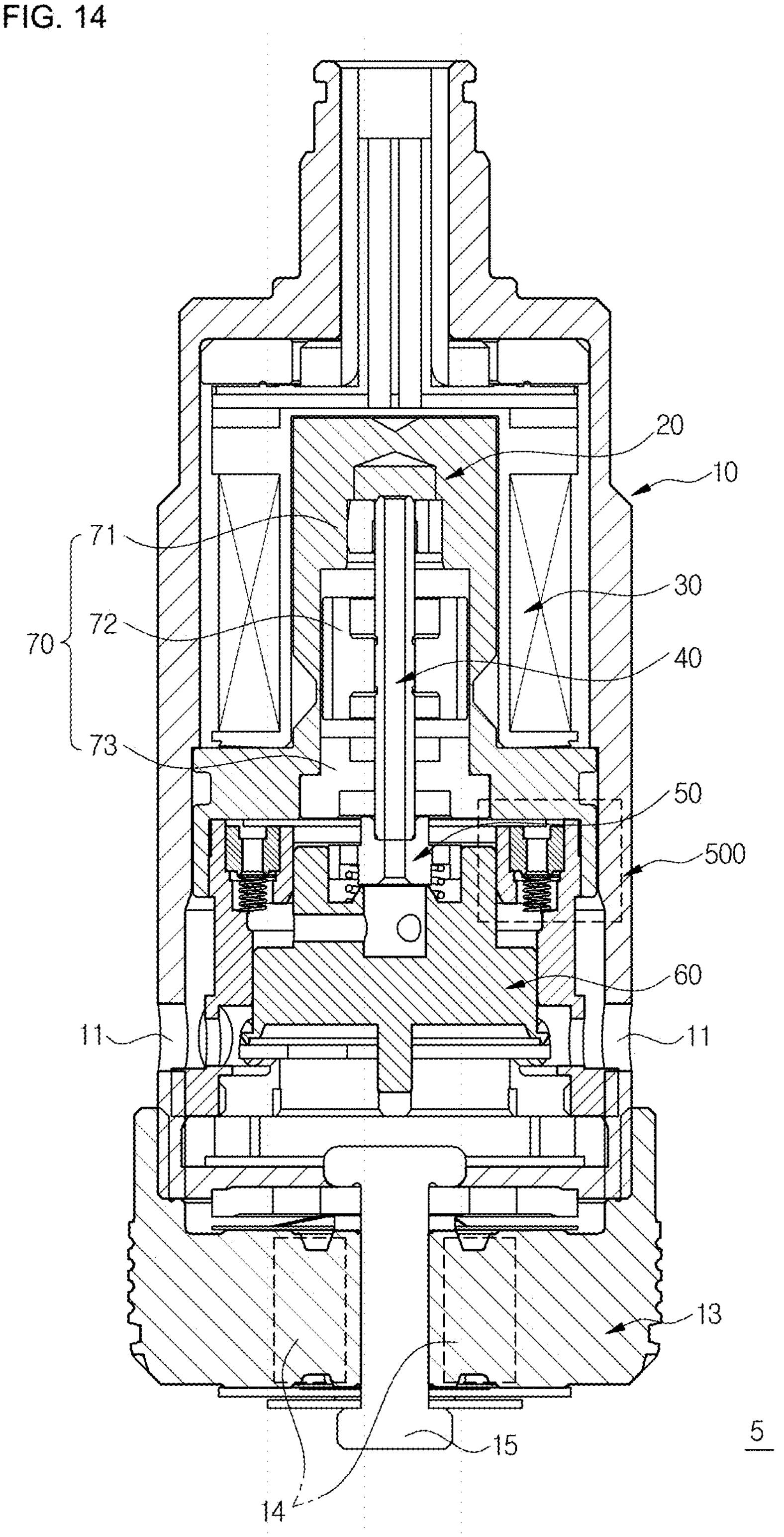
FIG. 14 is a cross-sectional view for illustrating a solenoid valve according to a fifth embodiment of the present disclosure.
Figure 15:
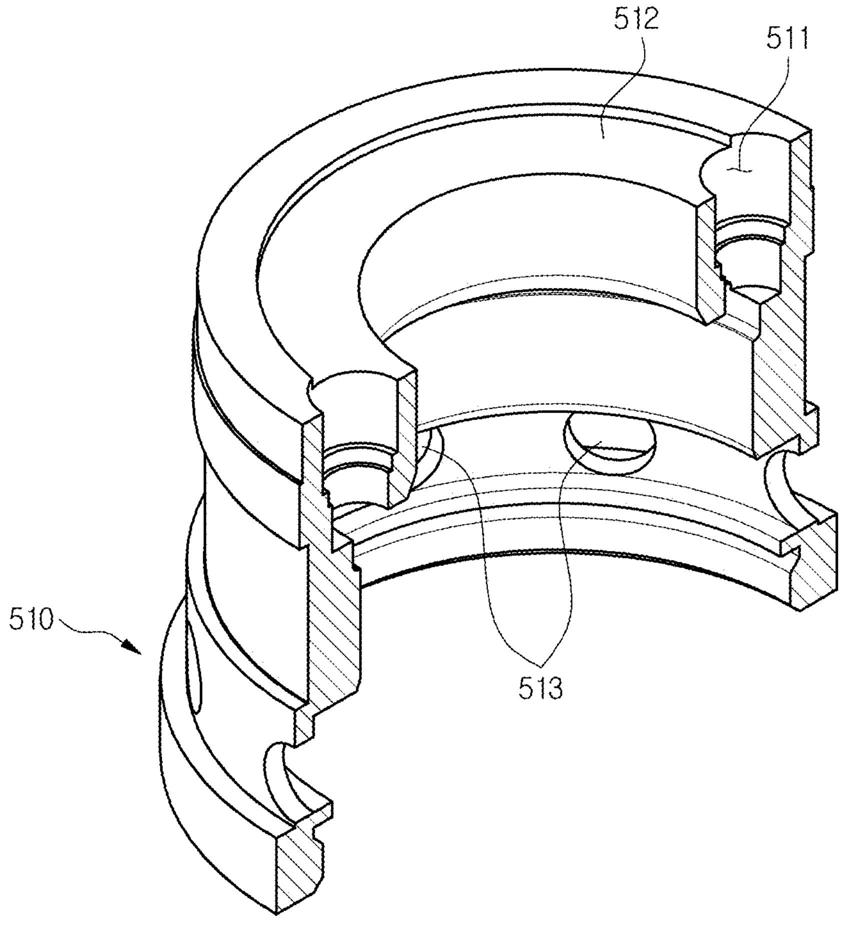
FIG. 15 is a cross-sectional perspective view for illustrating a housing included in a solenoid valve according to a fifth embodiment of the present disclosure.
Figure 16:
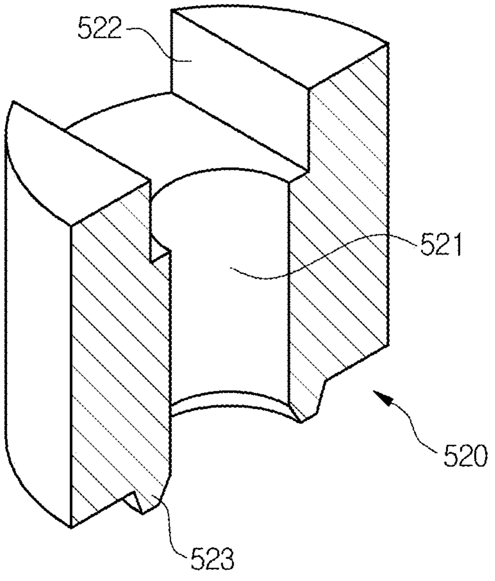
FIG. 16 is a cross-sectional perspective view for illustrating a plug included in a solenoid valve according to a fifth embodiment of the present disclosure.
Figure 17:
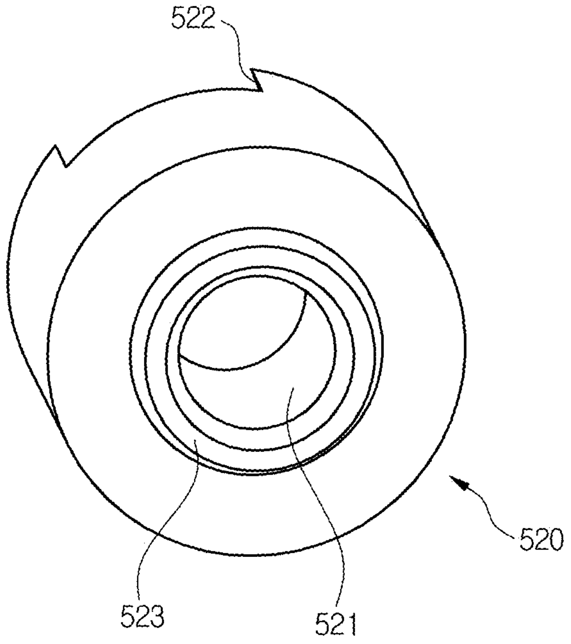
FIG. 17 is a perspective view for illustrating a plug included in a solenoid valve according to a fifth embodiment of the present disclosure.
Figure 18:
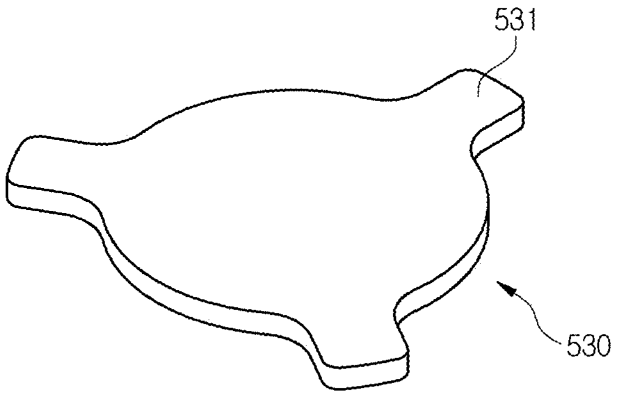
FIG. 18 is a perspective view for illustrating a disk included in a solenoid valve according to a fifth embodiment of the present disclosure.
Figure 19:
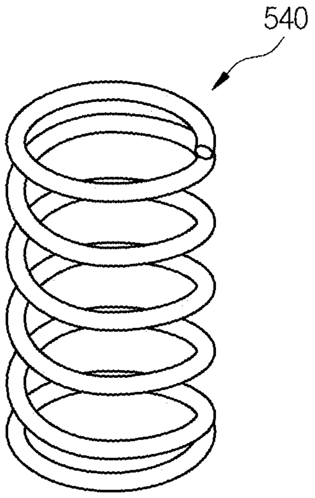
FIG. 19 is a perspective view for illustrating a spring included in a solenoid valve according to a fifth embodiment of the present disclosure.

FIG. 14 is a cross-sectional view for illustrating a solenoid valve according to a fifth embodiment of the present disclosure. FIG. 15 is a cross-sectional perspective view for illustrating a housing included in a solenoid valve according to a fifth embodiment of the present disclosure. FIG. 16 is a cross-sectional perspective view for illustrating a plug included in a solenoid valve according to a fifth embodiment of the present disclosure. FIG. 17 is a perspective view illustrating a plug included in a solenoid valve according to a fifth embodiment of the present disclosure. FIG. 18 is a perspective view illustrating a disk included in a solenoid valve according to a fifth embodiment of the present disclosure. FIG. 19 is a perspective view illustrating a spring included in a solenoid valve according to a fifth embodiment of the present disclosure. An overlapping description of the configuration described above in the embodiment will be omitted.

A solenoid valve 5 according to a fifth embodiment of the present disclosure may include a valve case 10, a valve body 20, a driver 30, a rod 40, a seat 50, a core 60, and a check valve 500. The check valve 500 may include a housing 510 having openings 513 configured to fluidly communicate with an opening 11 of the valve case 10, a plug 520 disposed above the housing 510, a disk 530 disposed under the plug 520, and a spring 540 configured to apply a restoring force to the disk 530. The disk 530 may have one or more legs 531 extending outward from an edge of the disk 530.

The plug 520 has, for example, but not limited to, a cylindrical shape with a channel 521 formed therein, and an accommodation part 511 having a size and/or shape corresponding to the plug 520 to accommodate the plug 520 may be formed in the housing 510. An inclined portion 523 for increasing a contact area with the disk 530 may be formed at or on a lower end of the plug 520.

A seating portion 512 may be formed on or at an upper side or portion of the housing 510. A groove 522 connected to the seating portion 512 may be formed on or at an upper side or portion of the plug 520. Therefore, a fluid may flow or move to sequentially pass through the channel 521 of the plug 520, the groove 522 of the plug 520, and the seating portion 512 of the housing 510.

When the disk 530 moves up to close the channel 521 of the plug 520, the inflow of the fluid flowing from an outside of the housing 510 to an inside of the housing 510 can be blocked. However, when the disk 530 moves down to open the channel 521 of the plug 520, the inflow of the fluid flowing from the inside of the housing 510 to the outside of the housing 510 can be allowed.

Figure 20:
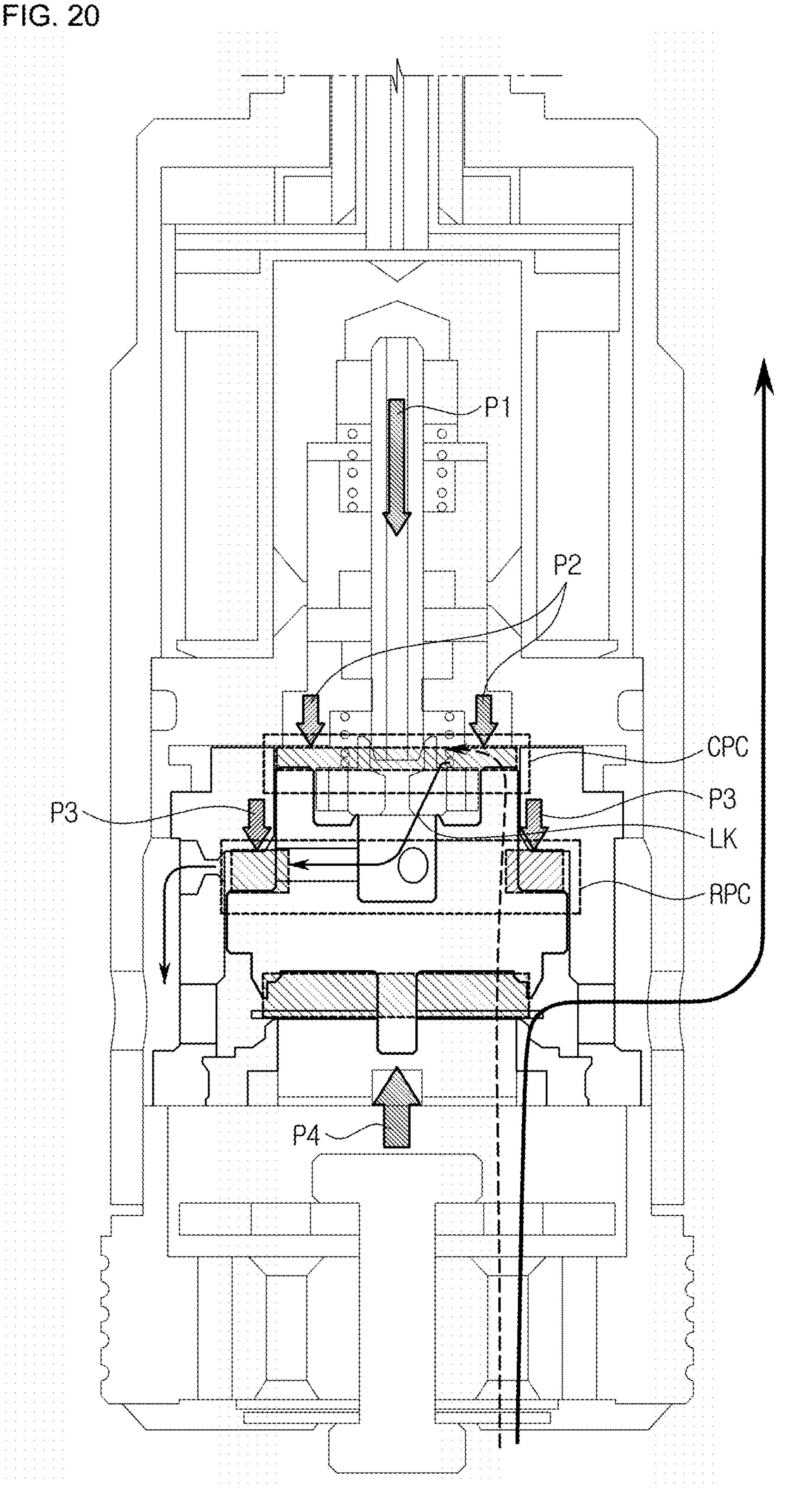
FIG. 20 is a cross-sectional view for schematically illustrating a fluid flow in a solenoid valve in the early stage of a compression stroke.
Figure 21:
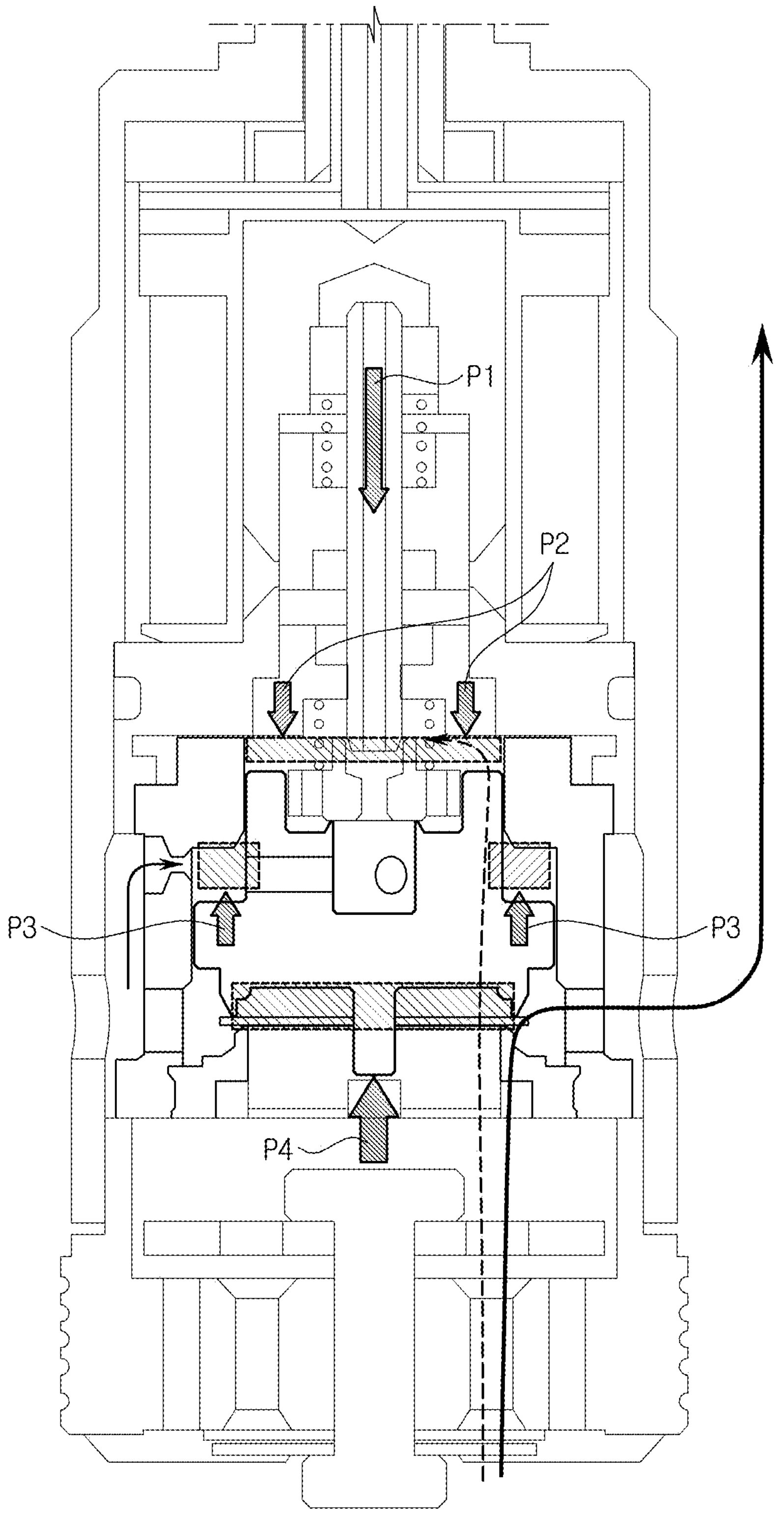
FIG. 21 is a cross-sectional view for schematically illustrating a fluid flow in the solenoid valve in the late stage of the compression stroke.
Figure 22:
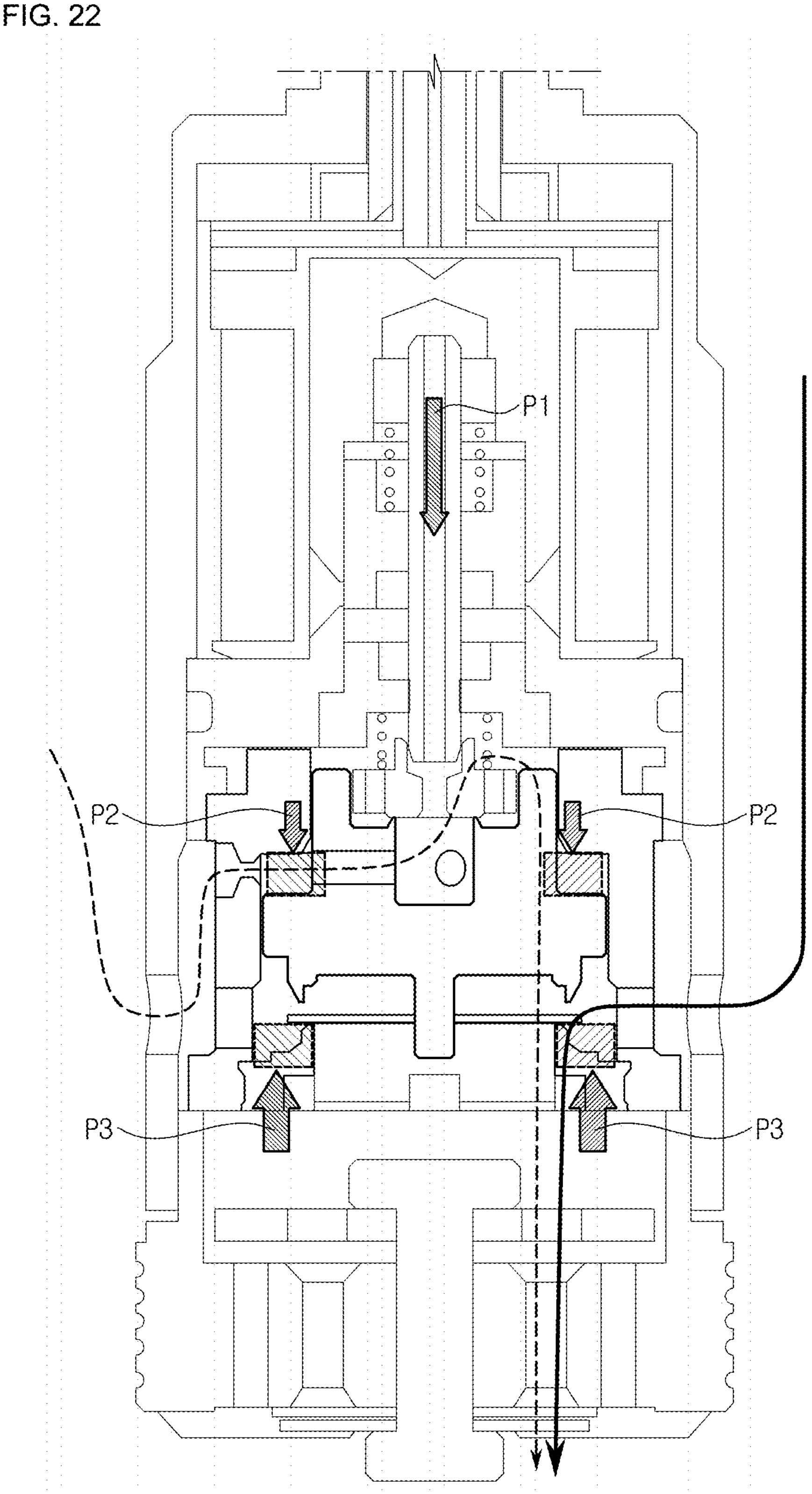
FIG. 22 is a cross-sectional view for schematically illustrating a fluid flow in the solenoid valve in the early stage of a retreat stroke.
Figure 23:
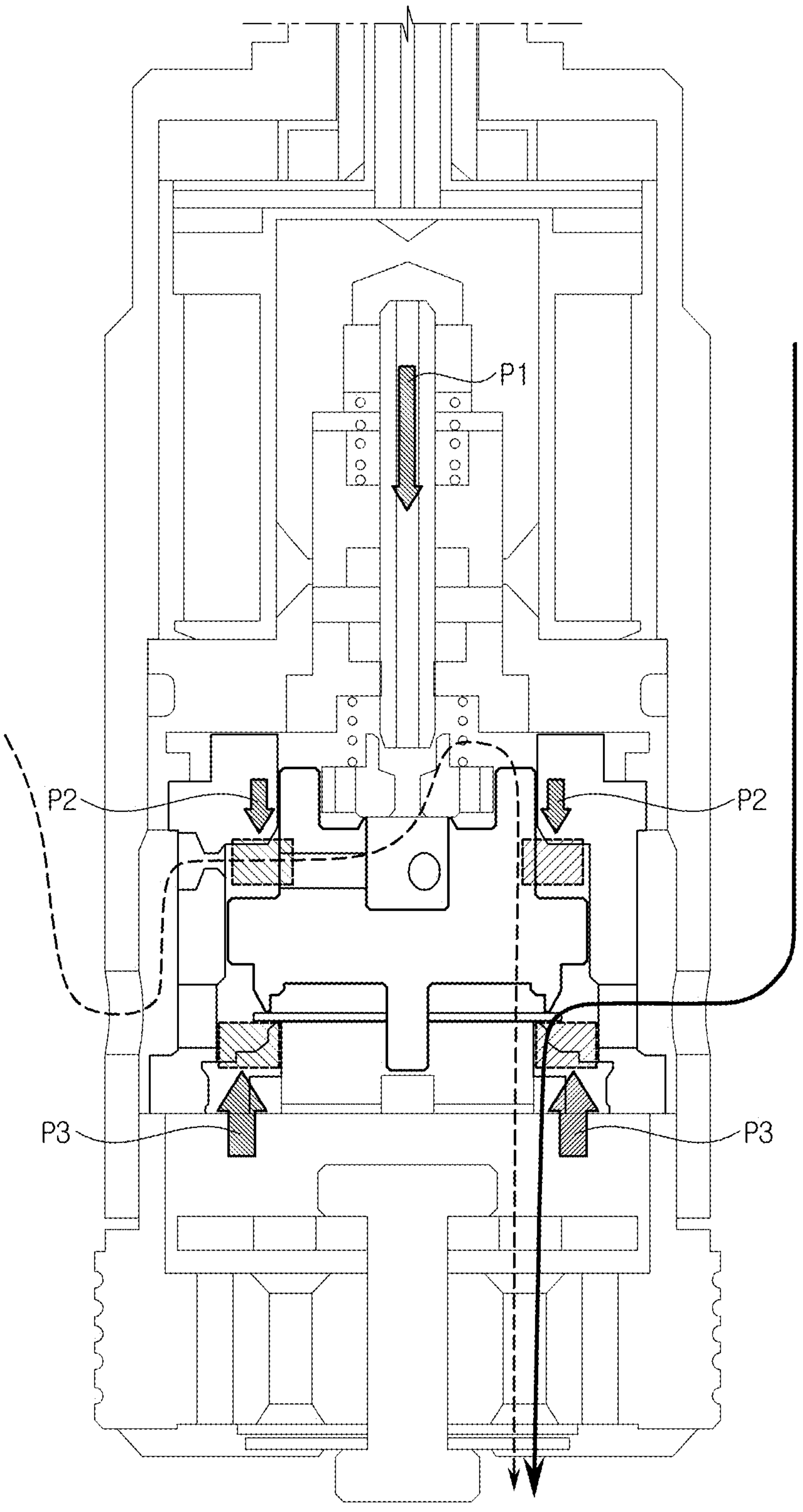
FIG. 23 is a cross-sectional view for schematically illustrating a fluid flow in the solenoid valve in the late stage of the retreat stroke.
Figure 24:
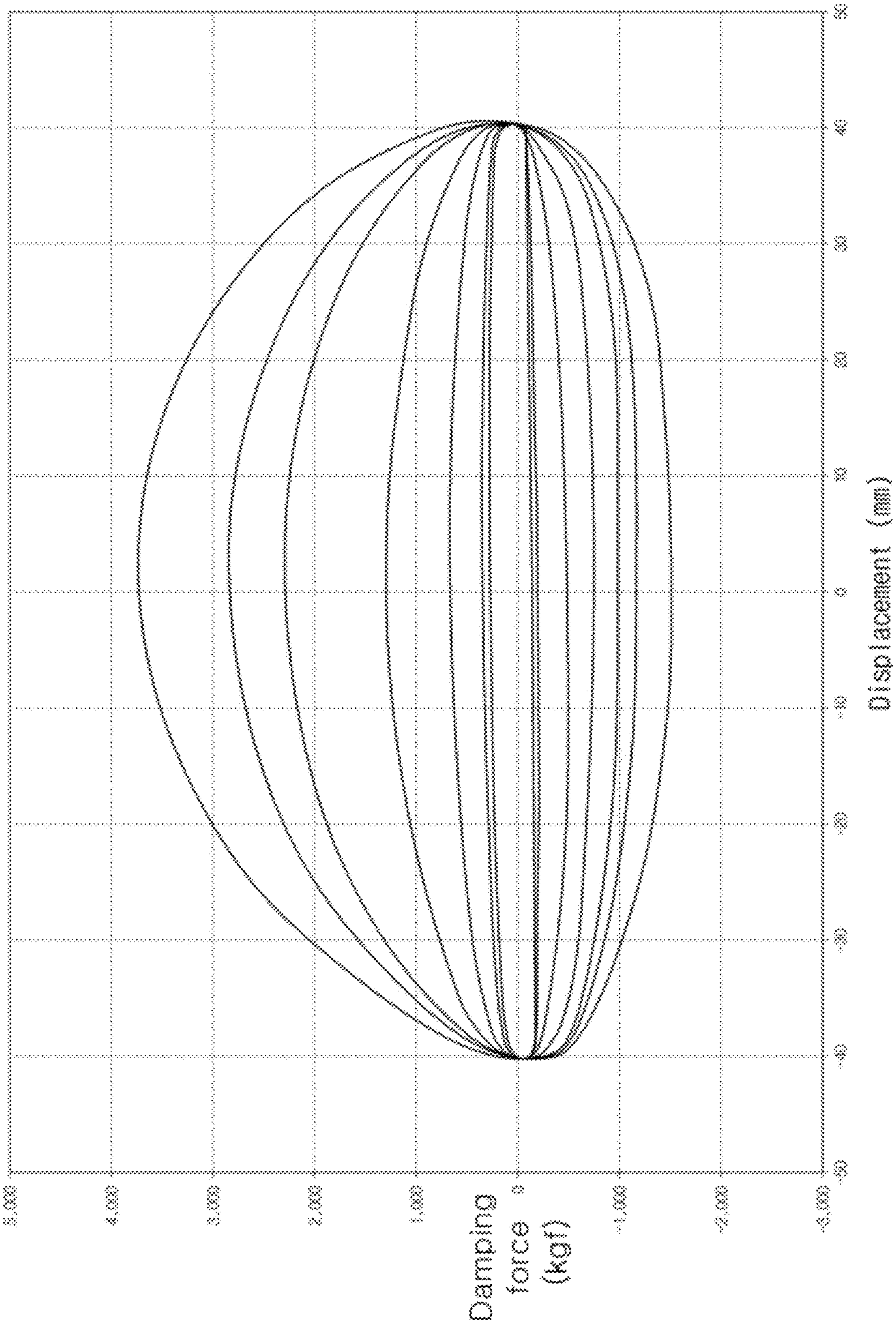
FIG. 24 is a graph for illustrating a normal damping force curve.
Figure 25:
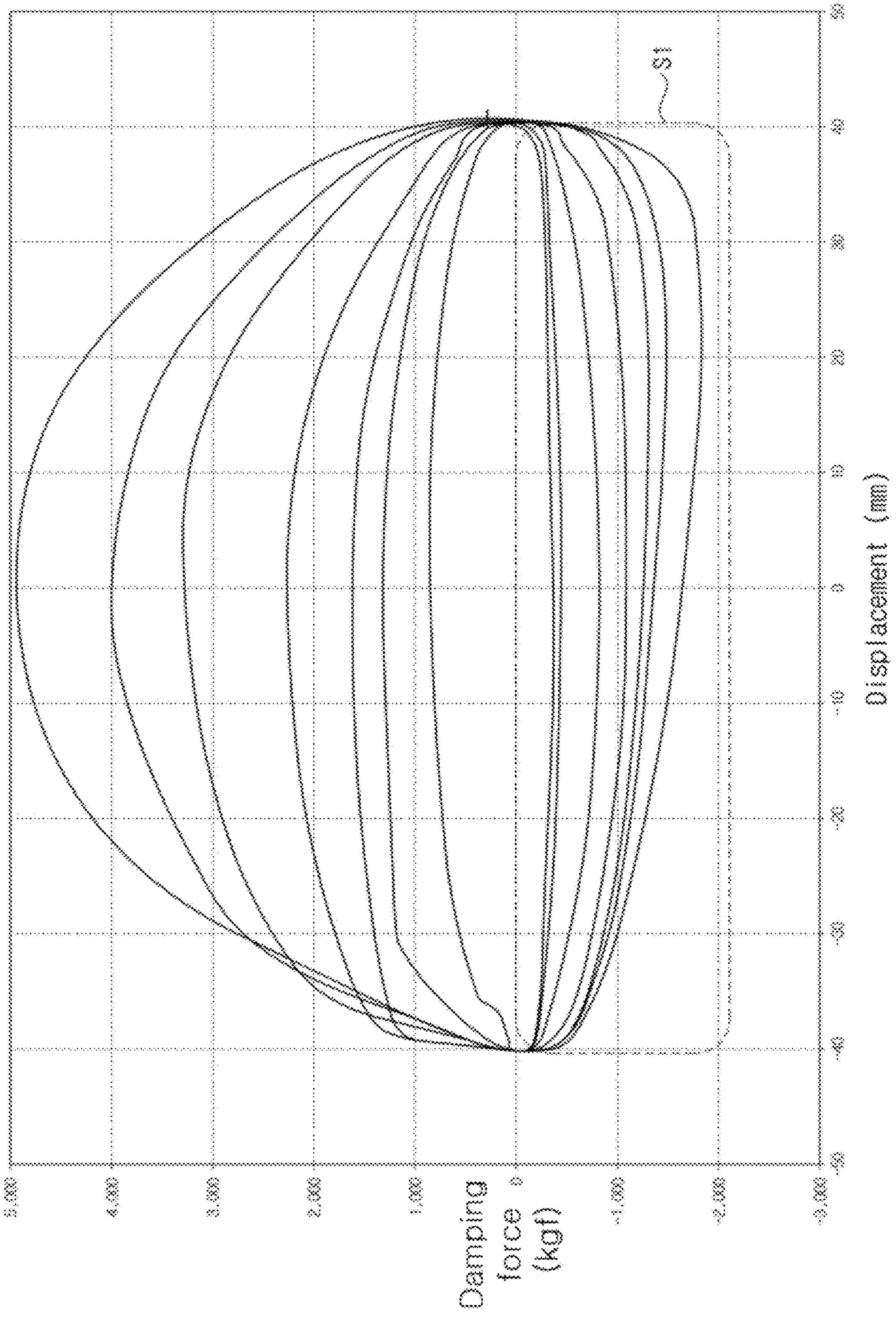
FIG. 25 is a graph for illustrating a damping force curve in which an asymmetry to left or right has occurred.
Figure 26:
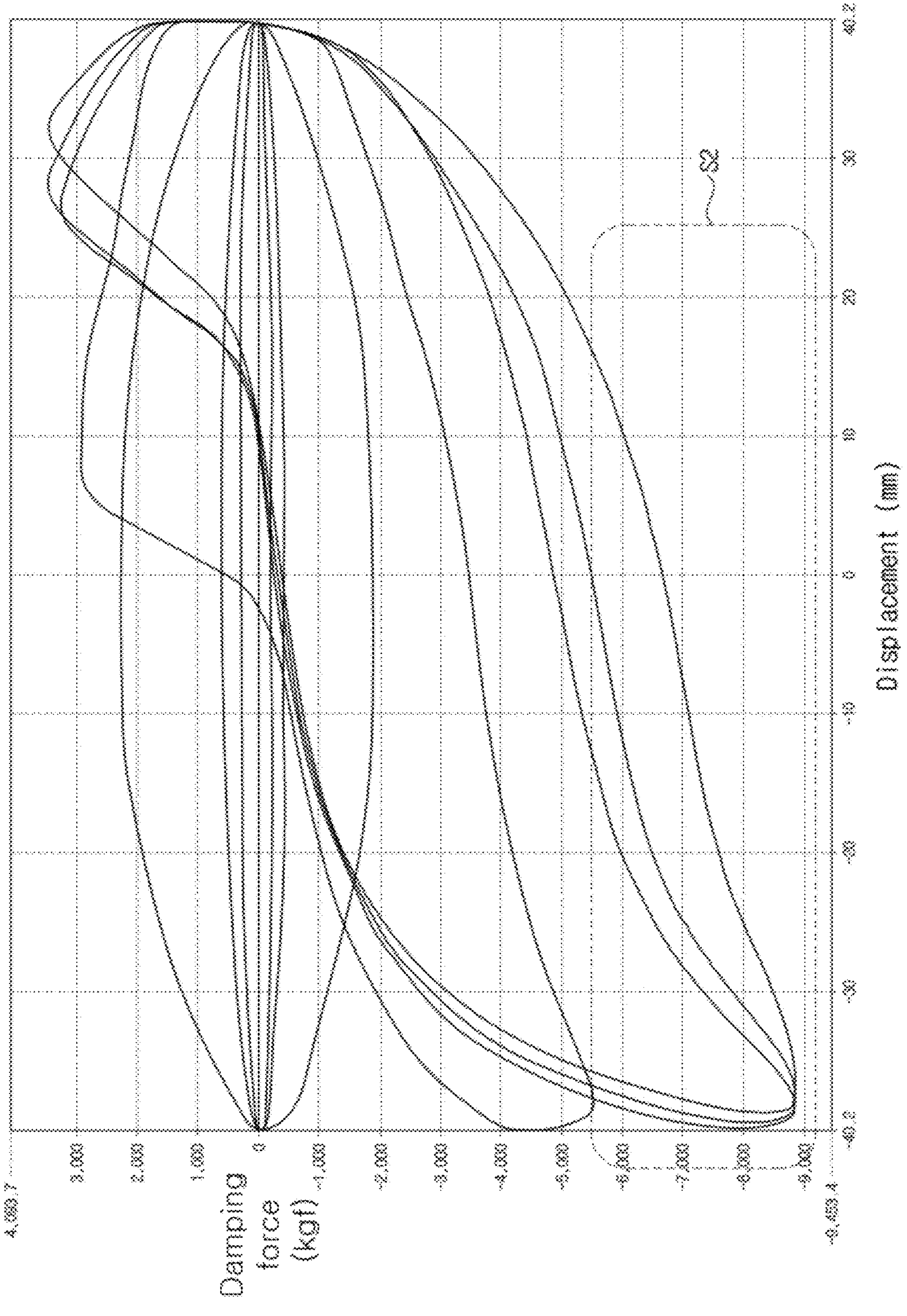
FIG. 26 is a graph for illustrating a state in which a damping force increases due to the occurrence of a phenomenon in which a compression pressure is locked.

FIG. 20 is a cross-sectional view for schematically illustrating a fluid flow in a solenoid valve in the early stage of a compression stroke. FIG. 21 is a cross-sectional view for schematically illustrating a fluid flow in the solenoid valve in the late stage of the compression stroke. FIG. 22 is a cross-sectional view for schematically illustrating a fluid flow in the solenoid valve in the early stage of a retreat stroke. FIG. 23 is a cross-sectional view for schematically illustrating a fluid flow in the solenoid valve in the late stage of the retreat stroke. FIG. 24 is a graph for illustrating a normal damping force curve. FIG. 25 is a graph for illustrating a damping force curve in which an asymmetry to left or right has occurred. FIG. 26 is a graph for illustrating a state in which a damping force increases due to the occurrence of a phenomenon in which a compression pressure is locked.

Referring to FIG. 20, positions of a compression pilot chamber (CPC) and a retreat pilot chamber (RPC) in the solenoid valve can be confirmed.

Referring to FIG. 25, a state in which a pressure of the RPC is changed during the compression stroke, thereby making a damping force curve unstable (left-right asymmetric) can be checked (see region S1).

Referring to the graph of FIG. 26 and an arrow indicated by LK in FIG. 20, when sealing performance between a pilot poppet and a pilot seat is degraded, a phenomenon in which a hydraulic pressure flows into the RPC (occurrence of leakage) and thus the compression stroke is locked occurs (see region S2).

Hereinafter, unlike the embodiments described above with reference to FIGS. 20 to 23, a mechanism in which the asymmetry occurs during the compression stroke in a type having no check valve will be described. Referring to FIGS. 20 to 23, a process in which a compression pressure is changed by discharging or introducing an oil in the RPC during the compression stroke can be checked.

Referring to FIG. 20, an upward-movement of a main poppet may appear. As a special case of the pressure, a residual pressure may be generated in the RPC after a retreat stroke. In addition, when the main poppet moves up, the oil inside the RPC may be discharged to a reservoir chamber, and a positive pressure may be generated.

Describing a pressure configuration, a main flow path pressure P4 may become equal to the sum of a solenoid thrust P1, a compression pilot pressure P2, and a retreat pilot pressure P3.

Referring to FIG. 21, a downward-movement of the main poppet may appear. In addition, when the main poppet moves down, the oil inside the RPC may be introduced into the reservoir chamber, and a negative pressure may be generated.

Describing a pressure configuration, the main flow path pressure P4 may become equal to a value obtained by subtracting the retreat pilot pressure P3 from the sum of the solenoid thrust P1 and the compression pilot pressure P2.

Referring to FIG. 22, the upward-movement of the main poppet may appear. As a special case of the pressure, a predetermined time is required until the pressure of the RPC is filled after compression, and the higher the speed, the larger the amount of stroke movement for a time at which the pressure of the RPC is increased, and thus a relatively large pressure reversal section may occur.

Describing a pressure configuration, the main flow path pressure P3 may become equal to the sum of the solenoid thrust P1 and the compression pilot pressure P2.

Referring to FIG. 23, the main flow path pressure P3 may become equal to the sum of the solenoid thrust P1 and the compression pilot pressure P2.

According to some embodiments of the present disclosure, in order to resolve the problems, a flow path, a check valve (e.g. disk clamping type check valve, a disk lift type check valve, or a ball type check valve), and a spring may be added to a main housing.

Therefore, according to some embodiments of the present disclosure, by allowing the fluid to flow into the RPC during the compression stroke and minimizing the change in the pressure of the RPC, it is possible to maintain a stable damping force (e.g. a damping force symmetric to left and right) during the compression stroke. In addition, according to certain embodiments of the present disclosure, by expanding the pilot chamber to the RPC during the compression stroke, it is possible to fundamentally resolve the phenomenon in which the hydraulic pressure is introduced into the RPC and thus the compression stroke is locked. In addition, according to some embodiments of the present disclosure, by adding the spring to reinforce a rigidity adjustment function of a check spring to the solenoid valve, it is possible to adjust the pressure of the RPC, as necessary.

As is apparent from the above description, according to a solenoid valve according to certain embodiments of the present disclosure, by allowing a fluid to flow into the RPC during the compression stroke, it is possible to reduce or minimize a change in pressure of the RPC.

A solenoid valve according to some embodiments of the present disclosure can allow a curve of a compression damping force to be stably (e.g. symmetrically in a left-right direction) maintained.

A solenoid valve according to certain embodiments of the present disclosure can expand the pilot chamber to the RPC during the compression stroke, thereby fundamentally resolving a phenomenon in which a hydraulic pressure is introduced into the RPC and thus the compression stroke is locked.

As described above, although the present disclosure has been described by the limited embodiments and drawings, the present disclosure is not limited thereto, and it goes without saying that various modifications and changes are possible by those skilled in the art to which the present disclosure pertains without departing from the technical spirit of the present disclosure and the equivalent scope of the appended claims.

What is claimed is:

1. A solenoid valve comprising:

a valve case having a first opening for flowing fluid;

a valve body positioned in the valve case;

a rod configured to be vertically movable by a driver;

a seat provided at an end portion of the rod to move according to movement of the rod;

a core in contact with the seat to move according to movement of the seat; and a check valve surrounding a periphery of the core and disposed in the valve body, wherein the check valve includes:

a housing having second openings configured to fluidly communicate with the first opening of the valve case; and an opening and closing module having one or more third openings to selectively allow the fluid to flow and installed in the housing of the check valve, wherein the opening and closing module includes:

a sub-seat having of the one or more third openings; and a valve ring disposed on the sub-seat, and wherein the opening and closing module is configured to:

block an inflow of the fluid flowing from an outside of the housing of the check valve to an inside of the housing of the check valve in a state that the valve ring moves up and closes the one or more third openings of the sub-seat, and allow a flow of the fluid flowing from the inside of the housing of the check valve to the outside of the housing of the check valve in a state that the valve ring moves down and is spaced apart from the one or more third openings of the sub-seat.

2. The solenoid valve of claim 1, wherein the opening and closing module includes:

a plug accommodated in the housing of the check valve;

a ball configured to be vertically movable within an inside space of the plug; and a disk disposed having the one or more third openings, wherein the ball is disposed between the plug and the disk.

3. The solenoid valve of claim 2, wherein a first channel having a smaller diameter than the ball is formed at an upper portion of the plug, and a second channel having a smaller diameter than the ball is formed at a lower portion of the plug, and the first channel and the second channel are connected to each other.

4. The solenoid valve of claim 3, wherein the opening and closing module is configured to:

block an inflow of the fluid flowing from an outside of the housing of the check valve to an inside of the housing of the check valve in a state that the ball moves up and closes an end of the first channel, and allow a flow of the fluid flowing from the inside of the housing of the check valve to the outside of the housing of the check valve in a state that the ball moves down and is in contact with the disk.

5. The solenoid valve of claim 1, wherein a channel groove for forming a flow path of the fluid is formed on the sub-seat.

6. The solenoid valve of claim 1, further comprising a guide formed in the valve body to guide the movement of the rod.

7. The solenoid valve of claim 1, further comprising a reservoir configured to store the fluid and formed under the core.

8. A solenoid valve comprising:

a valve case having a first opening for flowing fluid;

a valve body positioned in the valve case;

a rod configured to be vertically movable by a driver;

a seat provided at an end portion of the rod to move according to movement of the rod;

a core in contact with the seat to move according to movement of the seat;

a housing disposed between the valve body and the core and having a second opening;

a sub-seat disposed on the housing;

a valve ring configured to be vertically movable under the sub-seat; and an opening and closing module having one or more third openings to selectively allow the fluid to flow and installed in the housing, the opening and closing module configured to:

block an inflow of the fluid flowing from an outside of the housing to an inside of the housing in a state that the valve ring moves up and closes the one or more third openings, and allow a flow of the fluid flowing from the inside of the housing to the outside of the housing in a state that the valve ring moves down and is spaced apart from the one or more third openings.

9. The solenoid valve of claim 8, further comprising a spring disposed between the valve ring and the housing.

10. The solenoid valve of claim 9, wherein the spring includes:

a first ring;

a second ring having a larger diameter than the first ring; and a seam part connecting the first ring and the second ring and having a pattern.

11. The solenoid valve of claim 9, wherein a groove at which a hole vertically passing through the sub-seat is formed is formed on the sub-seat.

12. The solenoid valve of claim 9, wherein the spring between the valve ring and the housing has a curved wave shape.

13. The solenoid valve of claim 12, wherein a channel groove for forming a flow path of the fluid passing through a third opening of the sub-seat is formed on the sub-seat.

* * * * *